Nov. 6, 1962  H. MAHN  3,062,120
DIAPHRAGM-CONTROL MECHANISM, PARTICULARLY FOR
CINEMATOGRAPHIC CAMERAS
Filed Jan. 12, 1960  2 Sheets-Sheet 1

INVENTOR:
Herbert Mahn
BY Karl F. Ross
Agent

Nov. 6, 1962  H. MAHN  3,062,120
DIAPHRAGM-CONTROL MECHANISM, PARTICULARLY FOR
CINEMATOGRAPHIC CAMERAS
Filed Jan. 12, 1960  2 Sheets-Sheet 2

INVENTOR:
Herbert Mahn

BY
Karl F. Ross
Agent

United States Patent Office 3,062,120
Patented Nov. 6, 1962

3,062,120
DIAPHRAGM-CONTROL MECHANISM, PARTICULARLY FOR CINEMATOGRAPHIC CAMERAS
Herbert Mahn, Kreuznach, Rhineland, Germany, assignor to Jos. Schneider & Co., Optische Werke, Kreuznach, Rhineland, Germany, a corporation of Germany
Filed Jan. 12, 1960, Ser. No. 1,932
Claims priority, application Germany Jan. 12, 1959
9 Claims. (Cl. 95—64)

My present invention relates to a mechanism for adjusting the diaphragm aperture of an optical objective in a photographic camera, particularly a camera used for the taking of motion pictures.

In the taking of motion pictures it is desirable to use a camera whose diaphragm not only can be indexed in different stop positions, as is the practice with photographic cameras in general, but is capable of free displacement under certain conditions between a wide-open and, preferably, a fully closed position to afford transitional effects known as "fade-ins" and "fade-outs." A system of this character has been described in U.S. Patent No. 2,918,856, issued December 29, 1959 to Karl Tesch and owned by the assignee of the present application.

An important object of this invention is to provide, in an objective system having an adjustable diaphragm adapted to be indexed in different stop positions, means for selectively inactivating the indexing mechanism in such manner that, upon re-activation of such indexing mechanism, the diaphragm automatically finds itself in the stop position it previously occupied.

Since a position of complete diaphragm closure is never used during ordinary picture taking, it is not desirable to provide the indexing mechanism with a zero stop. For fade-ins and fade-outs, however, brief periods of complete light cutoff are often desired so that the diaphragm should be able to close completely when the indexing mechanism is de-activated. It is, accordingly, another object of my invention to provide means for enabling complete closure of the diaphragm only in the inactive condition of the indexing mechanism.

A further object of the invention is to provide simple and convenient operating means for selectively adjusting a diaphragm with or without indexing and for clearly indicating to the user whether or not the indexing mechanism is operative.

An objective system to which the invention is applicable comprises an adjustable diaphragm and a pair of relatively movable (e.g. rotatable) members coupled with the diaphragm in a manner known per se to adjust its aperture by their relative motion; these members are provided with adjoining surface zones of which one carries a conventional indexing element, such as a spring-pressed ball, while the other is formed with a series of indentations to receive this element. A further member, displaceable with respect to the other two, is adapted to be selectively anchored to either of them and carries a shield interposable between the indexing element and the associated indentations. This shield, which may be a thin sheet-metal plate in the form of a ring segment, clears the indexing element when anchored to the member carrying the latter; when anchored to the other member, the shield overlies one or more of its depressions so that these will not be engaged by the indexing element which is cammed aside by the shield upon a subsequent adjustment of the diaphragm past the associated stop positions. The arrangement is advantageously such that, in any indexed position, the shield covers all the depressions representing smaller aperture ratios whereby the diaphragm can be closed (partially or completely) and opened again to its previous stop without interference from the indexing means.

In a preferred embodiment the member provided with the ball check or other indexing element is a stationary part of the objective housing, the other two members being concentric rings of which the outer one, carrying the shield, is provided with a handle alternately engageable with either the housing or the other ring. The handle is advantageously pivotable to occupy a generally axial position when engaging the housing and a substantially radial position when interconnecting the two rings, the latter position not only facilitating the use of the handle to rotate the rings so coupled but also serving to indicate that the indexing mechanism has been blocked. The shield, according to a further feature of the invention, may serve as an abutment for a projection on the indented diaphragm-setting ring to prevent complete closure of the diaphragm as long as the shield-carrying control ring is immobilized in its normal position relative to the housing.

In order to enable a selective coupling of the control ring with the setting ring in any of the indexed stop positions of the latter, and, if desired, also in some intermediate positions, the setting ring may be provided with a series of angularly spaced notches engageable by a spur of the control-ring handle. Cooperating abutments may also be provided between control ring and housing to mark their normal relative position in which the control ring is again immobilizable by a lodging of the handle in a recess of the housing. In such position the shield is withdrawn from the indexing element to allow for ordinary diaphragm adjustment.

The invention will be described in greater detail with reference to the accompanying drawing in which.

Figure 4:
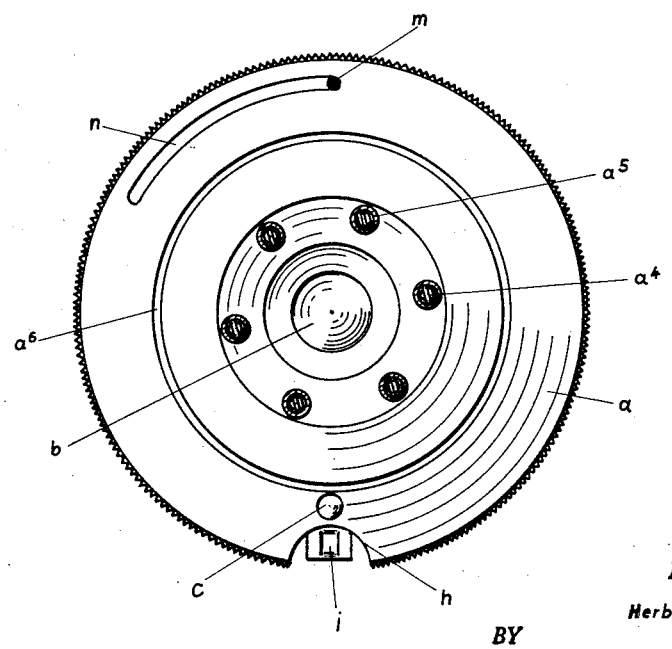
FIG. 4 is a rearward-looking view taken on the same line as indicated by the arrows 4—4 in FIG. 1.

The objective shown in the drawing comprises a stationary housing $a$ provided with a rear cap $a'$ whose male screw threads serve for the detachable connection of the objective to a motion-picture camera not shown. Another stationary member $a^2$ serves as a support for the front component of the camera objective $b$, the lenses of this component being held in position on a tubular liner $a^3$ in a manner known per se. The parts $a$ and $a^2$ are held together by screws $a^4$ whose heads are countersunk in recesses of the housing portion $a$ and which traverse bushings $a^5$ serving as abutments for the screw-connected parts. The screws $a^4$ and their bushings $a^5$ act as fulcra for the iris leaves $d^3$ of a conventional diaphragm, each of these leaves being further provided with a pin $d^4$ playing in a respective groove $d^5$ of a diaphragm-setting ring $d$ which concentrically surrounds the lens support $a^2$. An indexing element $c$, in the form of a ball check urged by a spring $c^2$ against a series of angularly spaced indentations $c'$ of ring $d$, is lodged in housing member $a$ at a location close to the periphery of that ring. Between ring $d$ and the housing member $a$ there is provided a narrow space, determined by the bushings $a^5$, accommodating a shield member $g$ in the form of a ring segment which is fastened by screws $g'$ to the side of a control ring $e$ concentrically surrounding the setting ring $d$. The latter also has an annular shoulder $d^6$ which is received in a corresponding groove $a^6$ (FIG. 4) of housing member $a$ to form a seal against radially incident light.

Ring $e$ carries an axially extending pin $m$ which enters an arcuate groove $n$ (FIG. 4) to allow for a rotation of the ring within predetermined limits. In its normal position, in which the pin $m$ abuts one of the ends of groove $n$ as shown, a slot $e'$ of the ring registers with a slot $h$ of housing member $a$ whereby a handle $f$, pivotable about a pin $f'$ between lugs $f^3$ of ring $e$, can be accommodated by the aligned slots in a position parallel to the objective axis to anchor the ring $e$ to the objective housing so as to prevent any rotation of that ring. In this retracted position of handle $f$, illustrated in dot-dash lines in FIG. 1, the setting ring $d$ is free to rotate independently of ring $e$ with respect to the housing $a$, $a^2$. Moreover, in this position the shield $g$ is offset from the location of ball check $c$, as will be apparent from FIG. 3, so that this ball check can successively enter the several indentations $c'$ which correspond to the diaphragm stops as marked on a scale $d'$ of ring $d$. When the last of these indentations (here shown to correspond to a relative aperture of 1:16), hidden by the shield $g$ in the position of FIG. 3, has emerged from that shield to face the indexing element $c$, a projecting setscrew $k$ on the face of ring $d$ engages the upper edge of the shield to prevent further rotation of the ring into diaphragm-closing position.

Figure 3:
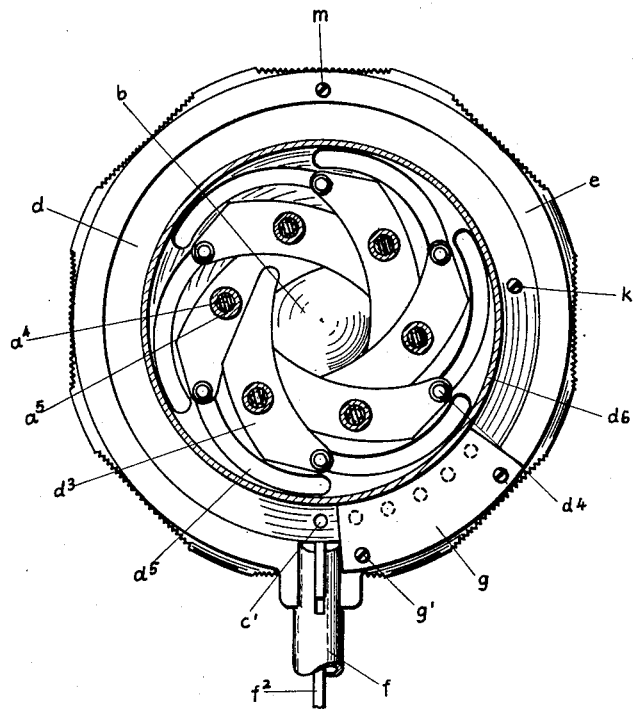
FIG. 3 is a forward-looking face view of the diaphragm-setting mechanism, taken on the line 3—3 of FIG. 1.

The settting ring $d$ is further provided, on its lower periphery as viewed in FIG. 3, with a series of notches $d^2$ of which alternate ones are aligned with the indentations $c'$, the remaining notches corresponding to non-indexed intermediate diaphragm positions. A spur $f^2$, longitudinally slidable within the stem of handle $f$, is under pressure from a spring $f^4$ to enter one of the notches $d^2$ when the handle is moved into its radially extending position which has been illustrated in full lines in FIG. 1. It will be noted that the head $f^5$ of handle $f$ is provided with a recess $f^6$ adapted to receive a resilient detent $i$ which tends to maintain the handle in its retracted position.

Figure 1:
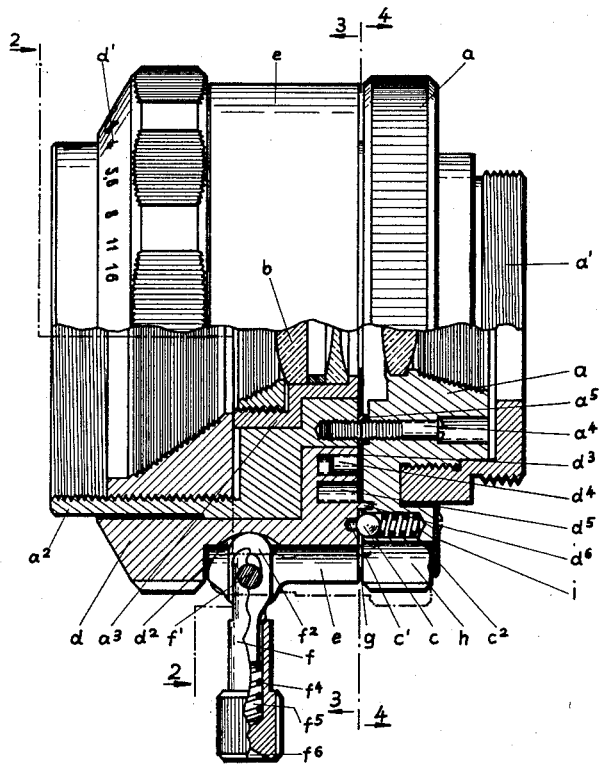
FIG. 1 is a side-elevational view, partly in section, of an optical objective embodying the invention.
Figure 2:
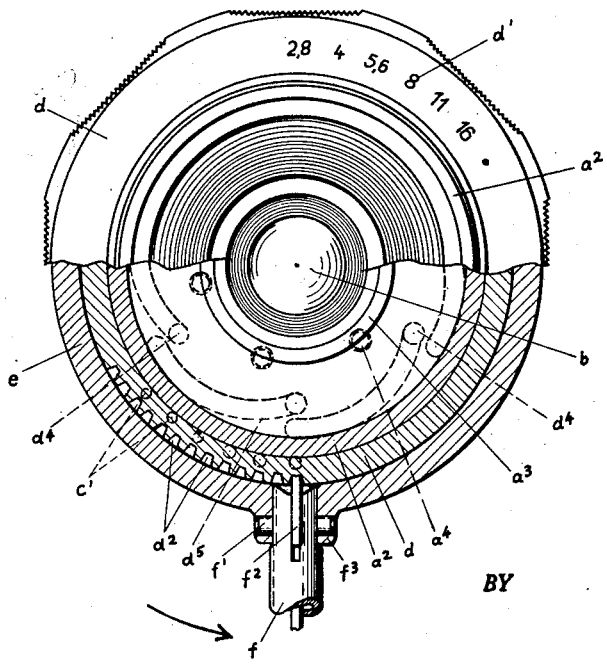
FIG. 2 is a front view of the objective, partly in section, taken on the line 2—2 of FIG. 1.

When the handle $f$ has been extended in the manner illustrated in FIG. 1 and described above, it couples the rings $d$ and $e$ for joint rotation while disengaging the ring $e$ from the stationary housing member $a$. Such coupling of the two rings may occur in any position of ring $d$ in which one of its notches $d^2$ is aligned with the spur $f^2$ of handle $f$ and, therefore, with the indexing element $c$, there being a total of eleven such positions in the particular embodiment illustrated. When the rings $d$ and $e$ are rotated together in a counterclockwise direction as indicated by the arrow of FIG. 2, this being the direction of progressively decreasing diaphragm apertures, the shield $g$ interposes itself between the ball $c$ and those of the indentations $c'$ which were still covered by it at the instant when the coupling of the rings was effected. Since the shield $g$ now moves together with ring $d$, setscrew $k$ no longer strikes the shield in the last indexed stop position so that the diaphragm can be completely closed in a smooth, continuous motion and re-opened in like manner until it has again reached its previously indexed stop. When this occurs, ball check $c$ snaps into engagement with the first indentation $c'$ not covered by the shield $g$ while simultaneously the pin $m$ of ring $e$ reaches the end of its slot $n$, thus preventing any overshooting of the previously selected stop. After the handle $f$ has been returned to its retracted position, the ring $d$ may again be rotated independently of ring $e$ to adjust the iris leaves $d^3$ to any indexed diaphragm stop.

The invention is, of course, not limited to the specific embodiment described and illustrated but may be realized in various modifications and adaptations intended to be embraced within the spirit and scope of the appended claims.

I claim:
1. In an optical objective, in combination, an adjustable diaphragm, a stationary housing member, a setting-ring member adapted to adjust said diaphragm by its rotation about an axis relative to said housing member, said setting-ring member being provided with a series of angularly spaced indentations facing said housing member, indexing means on said housing member engageable with any of said indentations in different stop positions of said diaphragm, a control ring adjacent said setting-ring member and said housing member rotatable about said axis, a handle on said control ring swingable into engagement with either of said members for selectively coupling same with said control ring, and shield means rigidly mounted on said control ring for registry with at least some of said indentations, thereby being interposable between the latter and said indexing means upon a coupling of said control ring with said setting-ring member; said shield means overlying indentations corresponding to diaphragm stops smaller than that represented by an indentation engaged by said indexing means upon the engagement of said handle with said housing member, thereby enabling an adjustment of said diaphragm past all of said smaller stops upon engagement of said setting-ring member by said handle.

2. The combination according to claim 1, further comprising co-operating abutment means on said setting-ring member and said control ring preventing adjustment of the diaphragm past the smallest of said stops upon engagement of said handle with said housing member.

3. The combination according to claim 2 wherein said shield means forms part of said abutment means.

4. The combination according to claim 1 wherein said setting-ring member is provided with peripheral notches, the angular separation of at least some of said notches corresponding to that of said indentations, said handle being swingable in an axial plane of said setting-ring member and including a projection engageable with a respective notch in the indexed position of any of said indentations.

5. The combination according to claim 4 wherein said control ring concentrically surrounds said setting-ring member, said projection forming an extension of said handle engageable with said notches in a substantially radial position of the handle.

6. The combination according to claim 5 wherein said extension is provided with spring means urging it into said notches in said radial handle position.

7. The combination according to claim 5 wherein said control ring and said housing member are provided with recesses aligned in a predetermined rotary position of said control ring to receive said handle.

8. The combination according to claim 7, further comprising co-operating stop means on said housing member and on said setting-ring member for preventing rotation of the latter beyond said predetermined rotary position.

9. The combination according to claim 1 wherein said indexing means comprises a spring-loaded ball check, said shield means comprising a segmental plate adapted to cam said ball check away from said indentations against its spring force.

References Cited in the file of this patent
UNITED STATES PATENTS

| | | |
|---|---|---|
| 2,422,815 | Baia | June 24, 1947 |
| 2,906,188 | Tesch | Sept. 29, 1959 |
| 2,918,856 | Tesch | Dec. 29, 1959 |